United States Patent
Curran et al.

(10) Patent No.: US 10,240,010 B2
(45) Date of Patent: Mar. 26, 2019

(54) GRAPHITIC NANOCOMPOSITES IN SOLID STATE MATRICES AND METHODS FOR MAKING SAME

(71) Applicants: Seamus Curran, Pearland, TX (US); Kang-Shyang Liao, Houston, TX (US); Alexander Wang, Houston, TX (US)

(72) Inventors: Seamus Curran, Pearland, TX (US); Kang-Shyang Liao, Houston, TX (US); Alexander Wang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 2 days.

(21) Appl. No.: 15/703,408

(22) Filed: Sep. 13, 2017

(65) Prior Publication Data
US 2018/0002499 A1 Jan. 4, 2018

Related U.S. Application Data

(62) Division of application No. 14/610,051, filed on Jan. 30, 2015, now Pat. No. 9,790,336.
(Continued)

(51) Int. Cl.
*H01B 1/04* (2006.01)
*H01B 1/24* (2006.01)
(Continued)

(52) U.S. Cl.
CPC ............ *C08J 5/005* (2013.01); *C01B 32/152* (2017.08); *C01B 32/156* (2017.08);
(Continued)

(58) Field of Classification Search
CPC ........ H01B 1/04; H01B 1/24; C01B 31/0213; C01B 31/0253; C01B 31/04; C08J 5/005; B82Y 30/00; B82Y 40/00
(Continued)

(56) References Cited

U.S. PATENT DOCUMENTS

| | | | | |
|---|---|---|---|---|
| 2006/0155376 A1* | 7/2006 | Asgari | .................. | B82Y 30/00 623/16.11 |
| 2007/0208155 A1* | 9/2007 | Zoromski | ............... | A61L 27/26 528/26 |
| 2009/0082500 A1* | 3/2009 | Chiang | ................ | C08K 5/5435 524/255 |

FOREIGN PATENT DOCUMENTS

CN 102872843 * 1/2013 ............. B01D 15/22

OTHER PUBLICATIONS

Kathi "Surface modification of multi-walled carbon nanotubes using 3-aminopropyltriethoxysilane." J Mater Sci (2008) 43:33-37 (Year: 2008).*

(Continued)

*Primary Examiner* — Tri V Nguyen
(74) *Attorney, Agent, or Firm* — Winstead PC (57) ABSTRACT

A composition and method for fabricating graphitic nanocomposites in solid state matrices is presented. The process for fabricating graphitic nanocomposites in solid state matrices may include selecting one or a mixture of specific graphitic nanomaterials. The graphitic nanomaterial(s) may be functionalizing with a moiety similar to the building blocks of the solid state matrices. The functionalized graphitic nanomaterials are mixed with the building blocks of the solid state matrices. The mixture may be cured, which causes in situ formation of the sol-gel solid state matrices that entraps and/or covalently links with the graphitic nanomaterials during the network growing process. This process allows the nanomaterials to be introduced into the matrices homogeneously without forming large aggregations.

13 Claims, 3 Drawing Sheets

Related U.S. Application Data (60) Provisional application No. 61/933,498, filed on Jan. 30, 2014.

(51) Int. Cl.

| | | |
|---|---|---|
| C08J 5/00 | (2006.01) | |
| D06M 11/74 | (2006.01) | |
| D06M 13/507 | (2006.01) | |
| D06M 13/513 | (2006.01) | |
| C01B 32/152 | (2017.01) | |
| C01B 32/156 | (2017.01) | |
| C01B 32/21 | (2017.01) | |
| C01B 32/20 | (2017.01) | |
| C01B 32/168 | (2017.01) | |
| C01B 32/194 | (2017.01) | |
| C01B 32/354 | (2017.01) | |
| B82Y 30/00 | (2011.01) | |
| C09C 1/56 | (2006.01) | |

(52) U.S. Cl.
CPC .......... *C01B 32/168* (2017.08); *C01B 32/194* (2017.08); *C01B 32/20* (2017.08); *C01B 32/21* (2017.08); *C01B 32/354* (2017.08); *D06M 11/74* (2013.01); *D06M 13/507* (2013.01); *D06M 13/513* (2013.01); *H01B 1/24* (2013.01); *B82Y 30/00* (2013.01); *C01P 2004/13* (2013.01); *C08J 2379/04* (2013.01); *C09C 1/56* (2013.01); *D06M 2400/02* (2013.01)

(58) Field of Classification Search
USPC ............. 252/500, 502, 519.2, 520, 1, 520.2, 252/521.3; 423/445 R, 445 B, 460; 977/842, 847
See application file for complete search history.

(56) References Cited

OTHER PUBLICATIONS

Wu "Synthesis, characterization, and properties of silane-functionalized expandable graphite composites." Journal of Composite Materials 46(12) (Year: 2011).*

Yang "Covalent functionalization of chemically converted graphene sheets via silane and its reinforcement." J. Mater. Chem., 2009, 19, 4632-4638 (Year: 2009).*

* cited by examiner

GRAPHITIC NANOCOMPOSITES IN SOLID STATE MATRICES AND METHODS FOR MAKING SAME

RELATED APPLICATIONS

This application is a divisional filing of U.S. Non-Provisional patent application Ser. No. 14/610,051, filed on Jan. 30, 2015, which claims the benefit of U.S. Provisional Patent Application No. 61/933,498, filed on Jan. 30, 2014, which is incorporated herein by reference.

STATEMENT REGARDING FEDERALLY SPONSORED RESEARCH

This invention was made with government support under Grant No. DD-N000141110069 from the Office of Naval Research at the US Department of Defense. The government has certain rights in the invention.

FIELD OF THE INVENTION

The present invention is directed to graphitic nanocomposites in solid state matrices and methods for making same. The resulting graphitic nanocomposite can be a form of a free standing bulk; a thin film coating adhered to a substrate (such as glass or plastic) or a three-dimensional network by infiltrating into a porous substrate (such as paper, fabric/textile or thread).

BACKGROUND OF THE INVENTION

In previous works entitled "Thiation of Carbon Nanotubes and Composite Formation" (U.S. Pat. No. 7,713,508 B2) and "Antennas Based on a Conductive Polymer Composite and Methods for Production Thereof" (U.S. Pat. No. 8,248, 305 B2), the formation of a highly conductive composite through tight networks of interwoven carbon nanotube bundles was demonstrated. Binding nanotubes into large, but tight bundles, dramatically alters the morphology and electronic transport dynamics of the composite. This enables the composite to carry higher levels of charge in the macroscale leading to conductivities as high as 1600 S/cm. When controlled and used appropriately, the interesting properties of these composites reveal their potential for practical device applications, such as improving the properties of an electromagnetic (EM) antenna/amplifier transducer. An electronic transducer was fabricated where the composite film can receive broadband radio waves up to GHz frequencies and convert them to measurable current. The benefit of this coating is that it can be used as an EM amplifier in the presence of other metals.

In additional to carbon nanotubes, graphene has attracted much attention in the past few years. Graphene possesses unique electronic properties, such as the quantum hall effect in condensed-matter materials and excellent mobility of charge carriers due to its unique $\pi$-conjugated carbon monolayer 2D system. Based on these qualities, many researchers have focus on the development of graphene-based electronic devices. However, understanding of EM attenuation/amplification properties of graphenes or graphene oxides is still limited. By using liquid-phase exfoliation of graphite in common organic solvent such as N-methyl-2-pyrrolidone (NMP), graphene/graphene oxide dispersion can be produced with high-yield. Because of the strong $\pi$-$\pi$ interactions, graphenes/graphene oxides are expected to process strong EM attenuation/amplification properties.

An important topic in nanocomposite material science is the design of multi-functional materials, which simultaneously allow one to satisfy several characteristics which are required for specific applications. For example, EM attenuation/amplification properties of graphitic nanocomposites are very useful for designing novel antenna or shielding/cloaking devices without using any metal components. More specifically, EM attenuation property of graphitic nanocomposites can reduce the intensity of incoming waves with selective wavelengths, which can be used as shielding (to block the EM wave passing through) or cloaking (to reduce the EW wave reflected back) devices. On the other hand, when applying graphitic nanocomposites on antenna devices, the EM amplification property allows selective wavelengths to be amplified and thus increase the power of selective signals. In addition, the increasing strength of graphitic nanocomposites is very valuable for increasing durability of many common plastic components. Although the study of controlled propagation of EM waves using nanomaterials is currently one of the most active fields of research, the scope of the research is still focused on the basic understanding of the mechanisms usually in a liquid dispersion. In order to apply to practical/commercial use, these nanomaterials need to be embedded into solid state matrices (e.g. bulks or thin films) while still maintain their unique EM properties. This becomes a significant challenge because there are many fundamental differences between liquid dispersions and solid state matrices. One example to illustrate this challenge is the design of organic systems such as molecules and polymers with $\pi$-conjugated electron system (e.g. carbon nanotubes and graphenes). Photophysical properties deriving from the transitions between different electronic states are extremely dependent on the environment of these nanomaterials. Decreasing of these responses due to decreasing of the quantum yield is observed as a consequence of large aggregation in the solid matrix. However, it also provides an opportunity if one can design a functional solid matrix having the interactions with the graphitic nanomaterials to perturb its molecular orbitals to increase the corresponding transitions, which is otherwise weak in a simple organic solution. The key is an accurate choice of the solid state matrix and preparation of the nanocomposites which not only preserve the dispersed state of the graphitic nanomaterials but also strengthen the desired EM properties through the synergic interplay between the solid state matrix (host) and the graphitic nanomaterials (guest).

To use a variety of graphitic nanomaterials such as carbon nanotube, graphene or carbon black as fillers for their electronic properties for antenna or EM shielding applications, different approaches are needed when forming each composite. Many researchers have tried to incorporate carbon nanotubes or graphenes in bulk polymers such as poly(methyl methacrylate) or polystyrene, but only with a very low concentration (e.g. less than 1.0 w/v %) before these nanomaterials start to aggregate due to the incompatibility between the polymer (host) and the graphitic material (guest). In previous works entitled "Waterproof Coating with Nanoscopic/Microscopic Features and Methods of Making Same" (U.S. patent application Ser. No. 14/277,325 filed May 14, 2014 claiming priority to U.S. Provisional Patent Application 61/823,127 filed May 14, 2013, which is hereby incorporated by reference in its entirety), it was demonstrated how to apply a silane based sol-gel system to produce waterproof coating on a variety of substrates.

Overcoming the abovenoted aggregation issues would allow higher concentrations graphitic nanocomposite materials to be produced. Systems and methods discussed herein utilized graphitic nanomaterials that are functionalized with a functional group with a moiety similar to a desired solid state matrix. The functionalized graphitic nanomaterials may be mixed with sol-gel chemicals and cured to form a homogeneous graphitic nanocomposite material.

SUMMARY OF THE INVENTION

In one embodiment, a process for fabricating graphitic nanocomposites in solid state matrices may include selecting one or a mixture of specific graphitic nanomaterials. The graphitic nanomaterials may be functionalized, such as by covalent bonding, with a moiety similar to the building blocks of the solid state matrices. The functionalized graphitic nanomaterials are mixed with the building blocks of the solid state matrices. For example, as a nonlimiting example the functionalized graphitic nanomaterials may be mixed with sol-gel chemicals comprising at least an alkoxysilane or metal oxide precursor. The in situ formation of the sol-gel solid state matrices during curing entraps and/or covalently links with the graphitic nanomaterials through the network growing process. This process allows the nanomaterials to be introduced into the matrices homogeneously without forming large aggregations.

In some embodiments, graphitic nanomaterials may comprise at least one type of material that is rich in carbon content that is densely packed in a regular $sp^2$-bonded structure. Examples of such materials include, but are not limited to, carbon black, carbon fiber, graphite, graphene, graphene oxides, carbon nanotubes, fullerenes and their derivatives.

In some embodiments, materials utilized to functionalize the graphitic materials may have a moiety similar to the building blocks of the solid state matrices. For the solid state matrices made of at least one alkoxysilane or metal oxide precursor, the moiety may comprise at least one alkoxysilane or metal oxide precursor and/or functional groups which can react with such alkoxysilane or metal oxide precursor to form covalent bonding. Nonlimiting examples of such materials may include aminosilanes and amines. Further nonlimiting examples may include polyethylenimine (PEI) or (3-aminopropyl)triethoxysilane (APTES). The functionalization may occur through reaction mechanisms such as, but not limited to, oxidation, epoxidation, thiation, amination, and polymerization (radical, cationic or anionic).

In some embodiments, sol-gel chemicals may comprise at least one alkoxysilane or metal oxide precursor having a general formula of $M(OR)_{4-x}R'_x$ (M=Si, Al, In, Sn or Ti; x=0 to 3), where R and R' can be the same or different and comprise hydrogen, a substituted or unsubstituted alkyl, a substituted or unsubstituted alkenyl, a substituted or unsubstituted alkynyl, a substituted or unsubstituted aryl, a substituted or unsubstituted epoxy and a substituted or unsubstituted amine.

In some embodiments, the resulting graphitic nanocomposite can be a form of a free standing bulk; a thin film coating adhered to a substrate (such as glass or plastic) or a three-dimensional network by infiltrating into a porous substrate (such as paper, fabric/textile or thread).

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION OF THE INVENTION

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Methods and composition for making graphitic nanocomposites in solid state matrices are discussed herein. The present invention offers new compositions and methods for making graphitic nanocomposites in solid state matrices.

In an illustrative nonlimiting embodiment, compositions and methods for making graphitic nanocomposites in solid state matrices comprise the following steps: selecting one or a mixture of specific graphitic nanomaterials, and functionalizing the graphitic nanomaterials. As a nonlimiting example, the graphitic nanomaterials may be single-walled carbon nanotube and may be functionalized by covalent bonding with a moiety similar to the building blocks of the solid state matrices. The functionalized graphitic nanomaterials are mixed with the building blocks of the solid state matrices. As a nonlimiting example, the functionalized graphitic nanomaterials may be mixed with sol-gel chemicals comprising at least an alkoxysilane or metal oxide precursor to form a homogeneous sol-gel/nanomaterial mixture. In some embodiments, optional intermediate steps may be desirable before formation of a three-dimensional network. For example, depending on the desired three-dimensional network, the sol-gel/nanomaterial mixture may be poured into a mold to form a free standing bulk, deposited on a flat substrate to form a thin film coating, infiltrated into a porous substrate, or the like to form the desired three-dimensional network. The solid state matrices may be formed by curing the functionalized graphitic nanomaterial and building blocks mixture at an elevated temperature, which in situ entraps and/or covalently links with the graphitic nanomaterials during the network growth process. For example, the sol gel and nanomaterial mixture may be cured after it has been poured into a mold, deposited on a substrate, infiltrated a porous substrate, or the like. As a nonlimiting example, the mixture may be cured at temperatures equal to or between 25 and 200° C. This process allows the nanomaterials to be introduced into the matrices homogeneously without forming problematic large aggregations.

Figure 1:
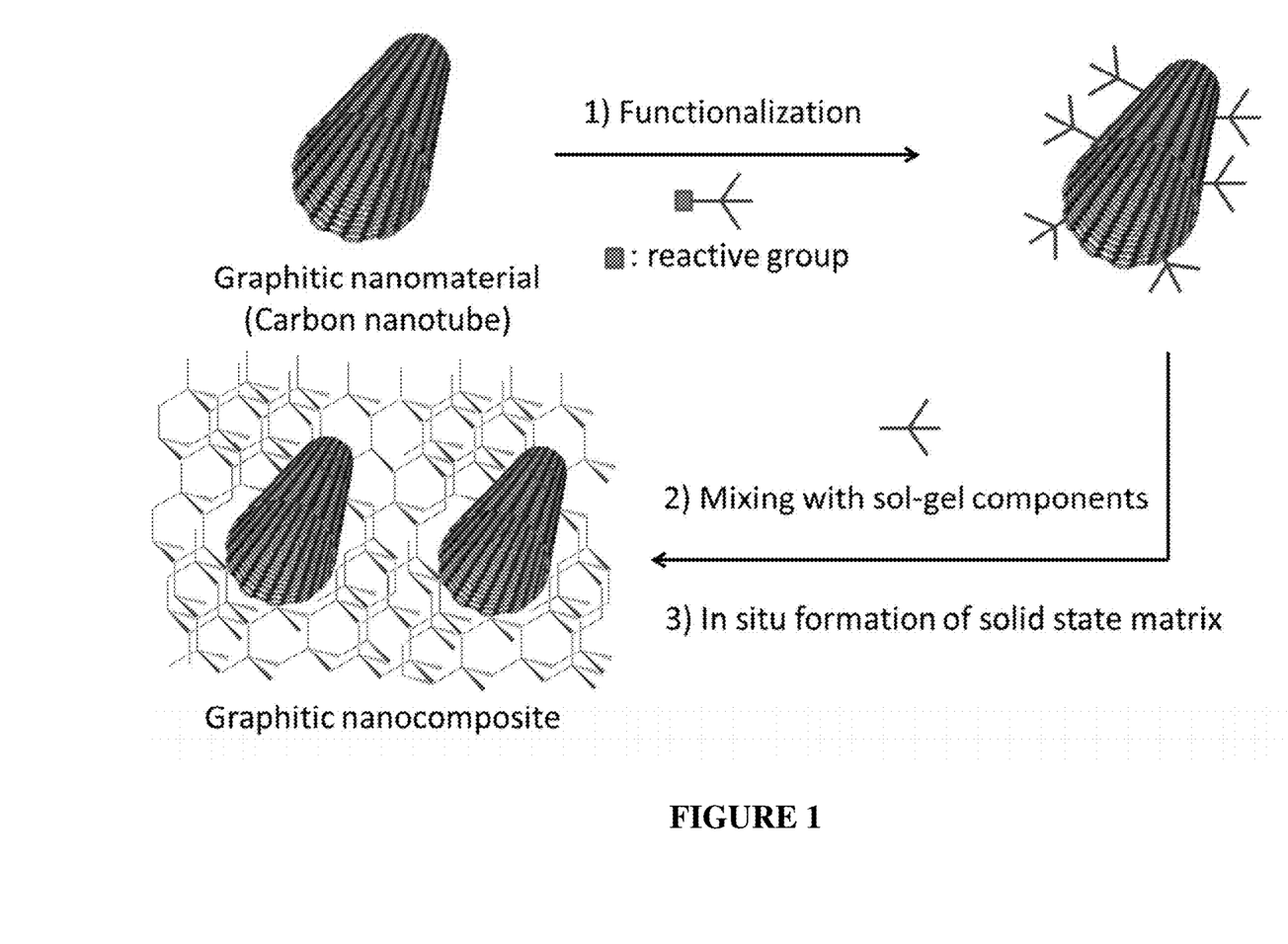
FIG. 1 is an illustrative embodiment of a process to produce graphitic nanocomposites in solid state matrices.

FIG. 1 illustrates the simplicity and the versatility of the process. The process does not require complicate syntheses of the starting materials to allow for compatibility between a graphitic nanomaterial and host material. The graphitic nanomaterials are first functionalized (preferably forming covalent bonds with the reactive groups) with a moiety similar to the building blocks of the solid state matrices. In a nonlimiting example shown, the graphitic nanomaterials may be single-walled carbon nanotubes. Secondly, the functionalized graphitic nanomaterials are mixed with sol-gel chemicals that are the building blocks of the solid state matrices. The in situ formation of the solid state matrices entraps and/or covalently links with the graphitic nanomaterials during the curing process. This process allows the nanomaterials to be introduced in the matrices homogeneously without forming large undesirable aggregations of the graphitic nanomaterials.

Graphitic nanomaterials as discussed herein refer to nanoscale carbon-rich materials that are crystalline allotropes of graphite. In some embodiments, graphitic nanomaterials may comprise at least one type of material that is rich in carbon content that is densely packed in a regular $sp^2$-bonded structure. Non-limiting examples of such materials include, but not limited to, carbon black, carbon fiber, graphite, graphene, graphene oxides, carbon nanotubes, fullerenes and their derivatives. In some embodiments, the graphitic nanomaterials may have sizes equal to or between 1 nm to 500 μm. In some embodiments, the graphitic nanomaterials may have sizes equal to or between 1 nm to 400 μm. In some embodiments, the graphitic nanomaterials may have sizes equal to or between 1 nm to 300 μm. In some embodiments, the graphitic nanomaterials may have sizes equal to or between 1 nm to 200 μm. In some embodiments, the graphitic nanomaterials may have sizes equal to or between 1 nm to 100 μm.

In some embodiments, graphitic nanomaterials may be functionalized using materials with a moiety similar to the building blocks of the solid state matrices. For the solid state matrices made of at least one alkoxysilane or metal oxide precursor, the moiety may comprise at least one alkoxysilane or metal oxide precursor and/or functional groups which can react with such alkoxysilane or metal oxide precursor to form covalent bonding. Nonlimiting examples of such materials may include aminosilanes and amines. Further nonlimiting examples may include polyethylenimine (PEI), (3-aminopropyl)triethoxysilane (APTES). The functionalization may occur through reaction mechanisms such as, but not limited to, oxidation, epoxidation, thiation, amination, and polymerization (radical, cationic or anionic).

Nonlimiting examples of chemicals suitable to functionalize graphitic nanomaterials and comprising at least one alkoxysilane or metal oxide precursor may include aminosilanes such as 4-AMINOBUTYLTRIETHOXYSILANE, 4-AMINOBUTYLTRIMETHOXYSILANE, 4-AMINO-3,3-DIMETHYLBUTYLMETHYLDIETHOXYSILANE, 4-AMINO-3,3-DIMETHYLBUTYLMETHYLDIMETHOXYSILANE, 4-AMINO-3,3-DIMETHYLBUTYLTRIETHOXYSILANE, 4-AMINO-3,3-DIMETHYLBUTYLTRIMETHOXYSILANE, 1-AMINO-2-(DIMETHYLETHOXYSILYL)PROPANE, 1-AMINO-2-(DIMETHYLMETHOXYSILYL)PROPANE, N-(2-AMINOETHYL)-3-AMINOISOBUTYLDIMETHYLETHOXYSILANE, N-(2-AMINOETHYL)-3-AMINOISOBUTYLDIMETHYLMETHOXYSILANE, N-(2-AMINOETHYL)-3-AMINOISOBUTYLMETHYLDIETHOXYSILANE, N-(2-AMINOETHYL)-3-AMINOISOBUTYLMETHYLDIMETHOXYSILANE, (AMINOETHYLAMINOMETHYL)PHENETHYLTRIETHOXYSILANE, (AMINOETHYLAMINOMETHYL)PHENETHYLTRIMETHOXYSILANE, N-(2-AMINOETHYL)-3-AMINOPROPYLMETHYLDIETHOXYSILANE, N-(2-AMINOETHYL)-3-AMINOPROPYLMETHYLDIMETHOXYSILANE, N-(2-AMINOETHYL)-3-AMINOPROPYLSILANETRIOL, N-(2-AMINOETHYL)-3-AMINOPROPYLTRIETHOXYSILANE, N-(2-AMINOETHYL)-3-AMINOPROPYLTRIMETHOXYSILANE, N-(2-AMINOETHYL)-11-AMINOUNDECYLTRIETHOXYSILANE, N-(2-AMINOETHYL)-11-AMINOUNDECYLTRIMETHOXYSILANE, N-(6-AMINOHEXYL) AMINOMETHYLTRIETHOXYSILANE, N-(6-AMINOHEXYL) AMINOPROPYLTRIMETHOXYSILANE, 3-(m-AMINOPHENOXY)PROPYLTRIETHOXYSILANE, 3-(m-AMINOPHENOXY)PROPYLTRIMETHOXYSILANE, AMINOPHENYLTRIETHOXYSILANE, m-AMINOPHENYLTRIMETHOXYSILANE, p-AMINOPHENYLTRIETHOXYSILANE, p-AMINOPHENYLTRIMETHOXYSILANE, N-3-[(AMINO(POLYPROPYLENOXY)]AMINOPROPYLTRIETHOXYSILANE, N-3-[(AMINO(POLYPROPYLENOXY)] AMINOPROPYLTRIMETHOXYSILANE, 3-AMINOPROPYLDIISOPROPYLETHOXYSILANE, 3-AMINOPROPYLDIISOPROPYLMETHOXYSILANE, 3-AMINOPROPYLDIMETHYLETHOXYSILANE, 3-AMINOPROPYLDIMETHYLMETHOXYSILANE, 3-AMINOPROPYLMETHYLBIS(TRIMETHYLSILOXY)SILANE, 3-AMINOPROPYLMETHYLDIETHOXYSILANE, 3-AMINOPROPYLMETHYLDIMETHOXYSILANE, 3-AMINOPROPYLPENTAMETHYLDISILOXANE, 3-AMINOPROPYLSILANETRIOL, 3-AMINOPROPYLTRIETHOXYSILANE, 3-AMINOPROPYLTRIMETHOXYSILANE, 3-AMINOPROPYLTRIS(METHOXYETHOXYETHOXY)SILANE, 3-AMINOPROPYLTRIS(TRIMETHYLSILOXY)SILANE, 11-AMINOUNDECYLTRIETHOXYSILANE, 11-AMINOUNDECYLTRIMETHOXYSILANE, 1,3-BIS(2-AMINOETHYLAMINOMETHYL)TETRAMETHYLDISILOXANE, BIS(p-AMINOPHENOXY) DIMETHYLSILANE, 1,3-BIS(3-AMINOPROPYL) TETRAMETHYLDISILOXANE, (3-TRIETHOXYSILYLPROPYL)DIETHYLENETRIAMINE or (3-TRIMETHOXYSILYLPROPYL)DIETHYLENETRIAMINE.

Nonlimiting examples of chemical having functional groups which can react with such alkoxysilane or metal oxide precursor to form covalent bonding may include di-amines such as 1,2-DIAMINOETHANE, PROPANE-1,3-DIAMINE, BUTANE-1,4-DIAMINE, PENTANE-1,5-DIAMINE, HEXANE-1,6-DIAMINE, 1,2-DIAMINOPROPANE, DIPHENYLETHYLENEDIAMINE, DIAMINOCYCLOHEXANE, o-XYLYLENEDIAMINE, m-XYLYLENEDIAMINE, p-XYLYLENEDIAMINE, o-PHENYLENEDIAMINE, m-PHENYLENEDIAMINE, p-PHENYLENEDIAMINE, 2,5-DIAMINOTOLUENE, 4,4'-DIAMINOBIPHENYL, 1,8-DIAMINONAPHTHALENE or POLY(ETHYLENE GLYCOL) DIAMINE; tri-amines such as DIETHYLENE TRIAMINE, DIPROPYL- ENE TRIAMINE, N-(3-AMINOPROPYL)-1,4-DIAMINOBUTANE, BIS(HEXAMETHYLENE) TRIAMINE, PROPANE-1,1,1-TRIAMINE, PROPANE-1,2,3-TRIAMINE, PENTANE-1,2,5-TRIAMINE, PENTANE-1,3,5-TRIAMINE, PHENYL-1,2,4-TRIAMINE, PHENYL-1,3,5-TRIAMINE, 2,4,6-TRIMETHYLBENZENE-1,3,5-TRIAMINE or 1,3,5-TRIAZINE-2,4,6-TRIAMINE, tetra-amines such as DIAMINOPROPYLTETRAMETHYLENEDIAMINE, TRIETHYLENETETRAMINE, TRIS(2-AMINOETHYL)AMINE, TRIS(2-AMINOPROPYL)AMINE or TRIS(4-AMINOPHENYL)AMINE; poly-amines such as POLYETHYLENIMINE, POLYPROPYLENIMINE, POLY(AMIDO AMINE) DENDRIMERS or TRIAZINE DENDRIMERS.

In some embodiments, the sol-gel solution used to form the solid state matrices may comprises at least one alkoxysilane or metal oxide precursor having a general formula of $M(OR)_{4-x}R'_x$ (M=Si, Al, In, Sn or Ti; x=0 to 3), where R and R' can be the same or different and comprise hydrogen, a substituted or unsubstituted alkyl, a substituted or unsubstituted alkenyl, a substituted or unsubstituted alkynyl, a substituted or unsubstituted aryl, a substituted or unsubstituted epoxy and a substituted or unsubstituted amine. An example of such sol-gel solution includes, but is not limited to, a solution comprised of such formula with tetraethyl orthosilicate, trimethoxy(propyl)silane, 1,2-bis(triethoxysilyl)ethane, (3-aminopropyl)triethoxysilane, 3-glycidoxypropyltrimethoxysilane, water, HCl(aq) and methanol/ethanol.

There are many advantages in the use of sol-gel derived materials as solid state matrices for graphitic nanomaterials: 1) the nanomaterials can be entrapped and covalently linked with the growing sol-gel network, which allows the nanocomposite to have a higher mechanical/environmental stability. 2) Low-temperature processing can be used in the case of hybrid materials, and the final materials have good chemical durability compared to other polymers. 3) Materials with high optical quality can be easily prepared and a large amount of graphitic nanomaterials (equal to or between 0.001 and 50 w/v %) can be introduced in the matrix without forming aggregation. 4) The versatility to introduce new functional fragments into the sol-gel backbone allows further exploration into further potential uses for graphitic nanocomposites, such as the possibility to strengthen the desired EM properties through the synergic interplay between the solid state matrix (host) and the nanomaterials (guest).

In some embodiments, concentration of graphitic nanomaterials in the sol-gel solution can range from equal to or between 0.001 and 50 w/v %. In some embodiments, concentration of graphitic nanomaterials in the sol-gel solution can range from equal to or between 0.001 and 10 w/v %. In some embodiments, concentration of graphitic nanomaterials in the sol-gel solution can range from equal to or between 10 and 50 w/v %. In some embodiments, concentration of graphitic nanomaterials in the sol-gel solution can range from equal to or between 20 and 50 w/v %. In some embodiments, concentration of graphitic nanomaterials in the sol-gel solution can range from equal to or between 30 and 50 w/v %. In some embodiments, concentration of graphitic nanomaterials in the sol-gel solution can range from equal to or between 40 and 50 w/v %. In some embodiments, to form the desired shape of the graphitic nanocomposites, the sol-gel/nanomaterial mixture may be poured into a mold to form a free standing bulk. As a nonlimiting example, the mold may have a volume between 1 $cm^3$ to 100 $m^3$. In some embodiments, the sol-gel/nanomaterial mixture may be deposited on a flat substrate to form a thin film coating. As a nonlimiting example, the film may have a thickness between 1 nm and 1 mm. The method of deposition may be comprised of, but not limited to, drop-casting, spin-coating, doctor-blading, inkjet-printing or spraying. In some embodiments, the sol-gel/nanomaterial mixture may be infiltrated into a porous substrate to form a three-dimensional network. As a nonlimiting example, the porous substrate may be soaked with the mixture for a set period of time by dipping or spraying equal to or between 1 second and 24 hours. The solvent is then removed and the mixture is cured at a set temperature equal to or between 25 and 200° C. to form an interpenetration solid state matrix of the functionalized graphitic nanomaterials and desired silane compound or metal oxide.

In some embodiments, one or more functional additives may be added into the functionalized graphitic nanomaterial and building blocks of the solid state matrix mixture. The functional additives do not impair the original functions of the mixture. In some embodiments, the original functions of the resulting graphitic nanocomposite in a solid state matrix has a variance equal to or less than 10% in comparison to the functional additive(s). The functional additives may have properties including, but not limited to, UV absorbing/blocking, anti-reflective, fire-retardant, conducting, anti-microbial, or the like. The additives can be composed of, but not limited to, organic/inorganic molecules/polymers, organic micro/nano materials in their natural or synthetic forms (e.g. particles, nanotubes and nanosheets); and metal/metal oxide micro/nano materials (e.g. silver, titanium oxide, zinc oxide, aluminum oxide and clay) in their natural or synthetic forms (e.g. particles, nanotubes and nanosheets). In some embodiments, the organic/inorganic molecules/polymers may have a molecular weight up to or equal to about 100,000 Da. In some embodiments, the organic micro/nano materials may have sizes equal to or between 1 nm to 500 μm. In some embodiments, the organic micro/nano materials may have sizes equal to or between 1 nm to 400 μm. In some embodiments, the organic micro/nano materials may have sizes equal to or between 1 nm to 300 μm. In some embodiments, the organic micro/nano materials may have sizes equal to or between 1 nm to 200 μm. In some embodiments, the organic micro/nano materials may have sizes equal to or between 1 nm to 100 μm. In some embodiments, the metal/metal oxide micro/nano materials may have sizes equal to or between 1 nm to 500 μm. In some embodiments, the metal/metal oxide micro/nano materials may have sizes equal to or between 1 nm to 400 μm. In some embodiments, the metal/metal oxide micro/nano materials may have sizes equal to or between 1 nm to 300 μm. In some embodiments, the metal/metal oxide micro/nano materials may have sizes equal to or between 1 nm to 200 μm. In some embodiments, the metal/metal oxide micro/nano materials may have sizes equal to or between 1 nm to 100 μm.

In preferred embodiments, the graphitic nanomaterials are comprised of graphene, graphene oxide, carbon nanotube, fullerenes and/or their derivatives.

In some embodiments, building blocks of a solid state matrix may be provided by a sol-gel solution. In preferred embodiments, a sol-gel solution comprised of tetraethyl orthosilicate, trimethoxy(propyl)silane, 1,2-bis(triethoxysilyl)ethane, 3-glycidoxypropyltrimethoxysilane, water, $HCl_{(aq)}$ and/or methanol/ethanol is used. Curing the sol-gel solution in situ entraps and/or covalently links the building blocks of the matrix with the graphitic nanomaterials. After mixing the sol-gel solution with the functionalized graphitic nanomaterials, the mixture may be cured to create an interpenetration solid state network. An interpenetration polymer network is defined as a combination of two or more polymers in network form which are synthesized in juxtaposition. Thus, there is some type of interpenetration form finely divided phases. The two or more polymer are at least partially interlaced on a polymer scale, but not covalently bonded to each other. The network cannot be separated unless chemical bonds are broken. The two or more networks can be envisioned to be entangled in such a way that they are concatenated and cannot be pulled apart, but not bonded to each other by any chemical bond. The interpenetration polymer network may exhibit dual phase continuity, which means that two/three or more polymers/oligomers/dimers in the system form phases that are continuous on a macroscopic scale.

In some embodiments, the methods to deposition graphitic nanocomposites in solid state matrices can vary depending on the substrates of interest, which are listed individually in the following experimental examples. The chemical solutions described below, which was used to treat various glass, plastic, paper, fabric/textile, thread and other substrates, may vary in their chemical constituents, concentration of reagents in solution, and deposition procedure. The composition of fabric/textile and thread that can be treated with the various treatments described below span an assortment of differing fiber species of both natural and/or synthetic, including but not limited to cotton, wool, silk, polyamide (nylon-6 and nylon-6,6), polyolefin, polyester, and their mixtures. The following sections are structured and arranged by the particular material type to be treated (e.g. glass, plastic, paper, fabric/textile and thread). Correspondingly, each material type will contain discussion about the composition of material, particular chemical solution(s) used, and depositional procedure.

Experimental Example

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

The following describes the general procedure to prepare a sol-gel/graphitic nanomaterial mixture by using polyethylenimine (PEI) functionalized graphitic nanomaterial. Amination procedures are known in the art and any suitable method may be utilized, such as a nonlimiting example described by Liao et al. (*Langmuir* 2008, 24, 4245-4253). The graphitic nanomaterial and PEI were first mixed in dimethylformamide. The mixture was sonicated for 30 minutes and stirred at 50° C. for 3 days to form the product. The resulting suspension was filtered through a 0.20 μm nylon membrane and the precipitate was washed with 1M HCl, 1M NaOH, water and methanol to remove any excess PEI. After drying, the PEI-graphitic nanomaterial was obtained. In the next step, the PEI-graphitic nanomaterial was mixed with 3-glycidoxypropyltrimethoxysilane in anhydrous methanol. The resulting mixture was sonicated for 30 minutes and stirred at 50° C. for 24 hours to form the product. The resulting suspension was mixed with the rest of the sol-gel components: tetraethyl orthosilicate, trimethoxy(propyl)silane, water and $HCl_{(aq)}$ at 60° C. for 12 hours to form the sol-gel/graphitic nanomaterial mixture.

The following describes the general procedure to prepare a sol-gel/graphitic nanomaterial mixture by using (3-aminopropyl)triethoxysilane (APTES) functionalized graphitic nanomaterial. The graphitic nanomaterial and APTES were first mixed in dimethylformamide. The resulting mixture was sonicated for 30 minutes and stirred at 50° C. for 3 days to form the product. The resulting suspension was filtered through a 0.20 μm nylon membrane and the precipitate was washed with methanol to remove any excess APTES. After drying, the APTES-graphitic nanomaterial was obtained. In the next step, the APTES-graphitic nanomaterial was mixed with the rest of the sol-gel components: tetraethyl orthosilicate, trimethoxy(propyl)silane, 1,2-bis(triethoxysilyl)ethane, 3-glycidoxypropyltrimethoxysilane, water and $HCl_{(aq)}$ in methanol/ethanol at 60° C. for 12 hours to from the sol-gel/graphitic nanomaterial mixture.

The following describes the procedure to prepare three different multi-walled carbon nanotube (MWNT)/sol-gel mixtures and study of their dispersion behavior in ethanol. Pristine MWNT, oxidized MWNT (using $H_2O_2$ as oxidant) or (3-aminopropyl)triethoxysilane (APTES) functionalized MWNT were first added respectively into a sol-gel solution containing tetraethyl orthosilicate, trimethoxy(propyl)silane, (3-glycidyloxypropyl)trimethoxysilane, and 1,2-bis(triethoxysilyl)ethane in water/ethanol at pH=5. The resulting mixtures were vigorously stirred for 10 minutes at 50° C. Subsequently, the mixtures were briefly sonicated at 35 kHz for 2 minutes and then stirred for 72 hours at 60° C. At about 48 hours into the process of heated stirring, the mixtures were again sonicated for 1 minute at 35 kHz, and then allowed to continue stirring at 60° C. After 72 hours of heated stirring, uniform mixtures were obtained.

Figure 2:
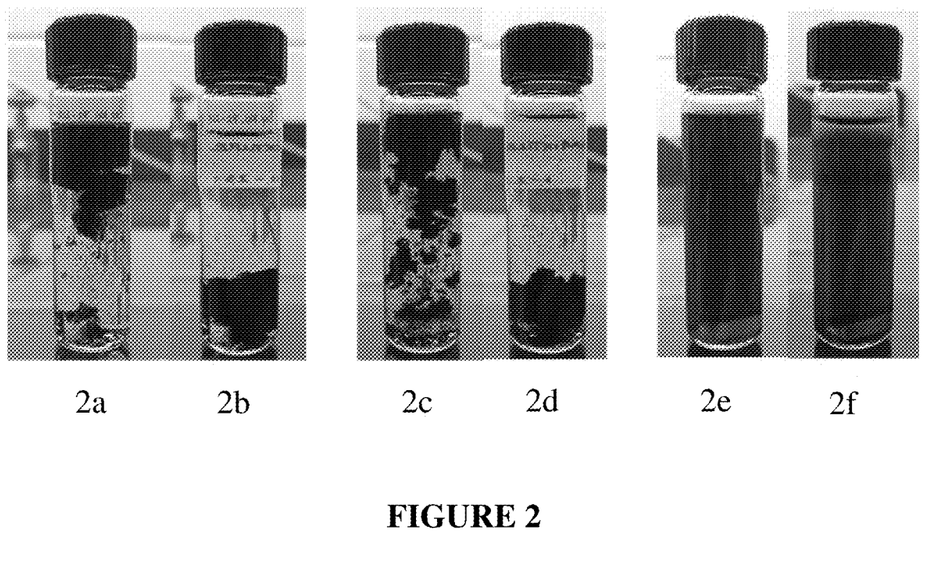
FIGS. 2a-2f show various multi-walled carbon nanotube (MWNT)/sol-gel mixtures dispersed in ethanol after heated stirring.

FIGS. 2a-2f shows various MWNT/sol-gel mixtures dispersed in ethanol after heated stirring. FIG. 2a shows pristine MWNT/sol-gel mixture 5 minutes after heated stirring. FIG. 2b shows pristine MWNT/sol-gel mixture 1 hour after heated stirring. The pristine MWNT separates from the sol-gel solution and aggregates. FIG. 2c shows oxidized MWNT/sol-gel mixture 5 minutes after heated stirring. FIG. 2d shows oxidized MWNT/sol-gel mixture 1 hour after heated stirring. The oxidized MWNT separates from the sol-gel solution and aggregates. FIG. 2e shows APTES functionalized MWNT/sol-gel mixture 5 minutes after heated stirring. FIG. 2f shows APTES functionalized MWNT/sol-gel mixture 1 hour after heated stirring. The APTES functionalized MWNT/sol-gel mixture maintain a homogeneous dispersion without aggregation.

Figure 3:
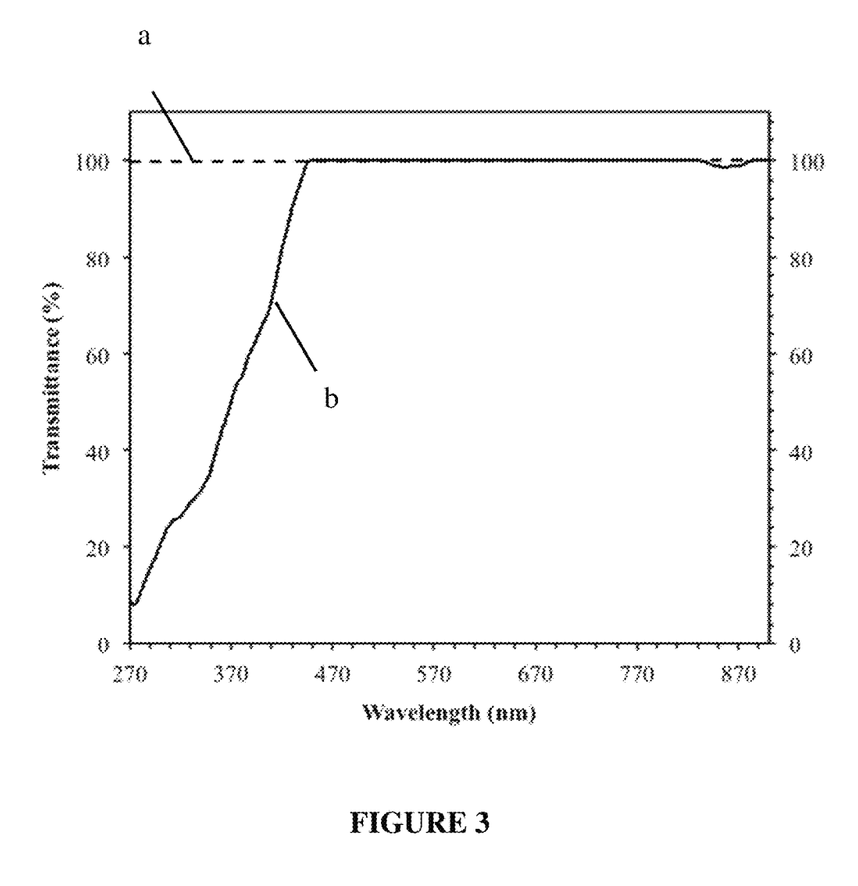
FIG. 3 shows transmission spectra of sol-gel solution in ethanol and 0.01 w/v % APTES functionalized MWNT/sol-gel mixture in ethanol.

FIG. 3 shows transmission spectra of sol-gel solution in ethanol (a) and 0.01 w/v % APTES functionalized MWNT/sol-gel mixture in ethanol (b). Noted that the APTES functionalized MWNT/sol-gel mixture is mostly transparent in the visible range (400 to 750 nm) but blocks most of the UV radiation (280 to 400 nm).

The following describes the coating procedure of glass with the sol-gel/graphitic nanomaterial mixture by dipcoating. A pre-cleaned glass was activated by submerging the glass into a 10% (w/v) NaOH aqueous solution for 1 hour. The glass surface was washed with water and methanol thoroughly. After drying, the glass was submerged into a containment vessel filled with the sol-gel/graphitic nanomaterial mixture. The sol-gel/graphitic nanomaterial mixture may be diluted to the appropriate concentration in suitable solvent/solvents (e.g. methyl-alcohol, ethyl-alcohol, isopropyl-alcohol, denatured ethyl-alcohol, etc.). It was then removed from the immersion bath and suspended over the solution containment vessel to allow any excess solution to drip off. The coated glass is transferred into an oven and cured at 130° C. for 10 minutes or until the nanocomposite is fully solidified.

The following describes the coating procedure of a tarpaulin made of a combination of plastic materials such as nylon and poly(ketone ethylene ether) with the sol-gel/graphitic nanomaterial mixture. The tarpaulin was first treated with a primer solution to promote the adhesion of the sol-gel/graphitic nanomaterial mixture. After curing at 130° C. for 10 minutes, the tarpaulin was then wetted completely by dipping or doctor-blading of the above sol-gel/graphitic nanomaterial mixture. After drying off the solvent at 25° C. under ventilation, the tarpaulin was cured at 130° C. for 10 minutes or until the nanocomposite is fully solidified.

The following describes the coating procedure of paper with the sol-gel/graphitic nanomaterial mixture by dip-coating. A solution containment vessel that is impervious and non-reactive with alcohols (e.g. methyl-, ethyl- or isopropyl-alcohol) was obtained that may also dimensionally accommodate the paper material to be treated as well as retain the corresponding requisite amount of solution. An appropriate amount of solution required per unit surface area of fabric is given by 0.20 mL/in$^2$ (this value varies slightly depending on the thickness and cross-weave density of the particular paper material). Using this value, an appropriate volume of solution required is determined by approximating the surface area of the material to be treated and multiplying by 0.20 mL/in$^2$. The sol-gel/graphitic nanomaterial mixture may be diluted to the appropriate concentration in suitable solvent/solvents (e.g. methyl-alcohol, ethyl-alcohol, isopropyl-alcohol, denatured ethyl-alcohol, etc.). Once the appropriate volume of solution was added to the solution containment vessel, the entire paper sample is immersed in the solution bath such that the material was rendered saturated. If possible, avoid folding the paper material when immersing in solution. Once the paper material was saturated, it was removed from the immersion bath and suspended over the solution containment vessel to allow any excess solution to drip off. Paper materials should be suspended over the solution containment vessel until a continuous stream of solution flowing off the material was no longer observed. The sample was allowed to continue dripping over the solution containment vessel until a drip-rate of 1 drop/s was attained. Subsequently, the treated material was transferred to a well-ventilated area where it was suspended, via clipping, pinning or hanging, to air-dry for a minimum of 30 minutes at room conditions (25±10° C., 50% relative-humidity). It should be noted that paper materials exhibiting an appreciably large portion of surface area that is not directly exposed to ambient air were anticipated to require longer drying times. After drying off the solvent under ventilation, the paper was cured at 130° C. for 10 minutes or until the nanocomposite is fully solidified.

The following describes the coating procedure of fabrics with the sol-gel/graphitic nanomaterial mixture by dip-coating. A solution containment vessel was obtained that is impervious and non-reactive with alcohols (e.g. methyl-, ethyl- or isopropyl-alcohol) that may also dimensionally accommodate the fabric material to be treated as well as retain the corresponding requisite amount of solution. An appropriate amount of solution required per unit surface area of fabric is given by 0.50 mL/in$^2$ (this value varies slightly depending on the thickness and cross-weave density of the particular fabric material). Using this value, an appropriate volume of solution required was determined by approximating the surface area of the material to be treated and multiplying by 0.50 mL/in$^2$. The sol-gel/graphitic nanomaterial mixture may be diluted to the appropriate concentration in suitable solvent/solvents (e.g. methyl-alcohol, ethyl-alcohol, isopropyl-alcohol, denatured ethyl-alcohol, etc.). Once the appropriate volume of solution was added to the solution containment vessel, the entire fabric sample is immersed in the solution bath such that the material was rendered saturated. If possible, avoid folding the fabric material when immersing in solution. Once the fabric material was saturated, it was removed from the immersion bath and suspended over the solution containment vessel to allow any excess solution to drip off. Fabric materials should be suspended over the solution containment vessel until a continuous stream of solution flowing off the material was no longer observed. The sample was allowed to continue dripping over the solution containment vessel until a drip-rate of 1 drop/s was attained. Subsequently, the treated material was transferred to a well-ventilated area where it was suspended, via clipping, pinning or hanging, to air-dry for a minimum of 30 minutes at room conditions (25±10° C., 50% relative-humidity). It should be noted that fabric materials exhibiting an appreciably large portion of surface area not directly exposed to ambient air were anticipated to require longer drying times. Following air-drying, the treated sample was cured in a tumble-dryer on a delicate setting (or at a temperature not to exceed the recommended tumble dry condition for each specific fabric materials) for 20 minutes or until the nanocomposite is fully solidified.

The following describes the coating procedure of threads with sol-gel/graphitic nanomaterial mixture by dip-coating. Samples of thread made by a variety of materials (e.g. cotton, nylon or polyester) 20 m in length were prepared on metal spools. The initial mass of the pristine bundle/spool of thread was measured. Each samples of thread, one-by-one, was installed into the coating apparatus by unraveling the bundle/spool into to loading spool, leaving the appropriate length of thread available for use in priming the coating apparatus. The solution containment vessel used was 30 cm in length and resembled a solution trough through which the thread must pass through while submerged in solution in order to fill a collection spool at the other end of the apparatus (opposite the loading spool). The reservoir was filled with sol-gel/graphitic nanomaterial mixture until the two rollers inside the solution containment vessel (trough) were entirely submerged. The sol-gel/graphitic nanomaterial mixture may be diluted to the appropriate concentration in suitable solvent/solvents (e.g. methyl-alcohol, ethyl-alcohol, isopropyl-alcohol, denatured ethyl-alcohol, etc.). The time required for the sample of thread to pass through the apparatus (i.e. from the loading spool to the spindle) was recorded and used to calculate the rate of thread propagation (2.5 m/s), which corresponded to a 30% pick-up (w/w) of sol-gel/graphitic nanomaterial mixture. Immediately after the collection spool was filled and the motor was turned off, the thread sample was removed from the collection spool and weighed to determine the wet mass. This was used to determine the pick-up mass. Once the wet mass had been measured, the samples were allowed to dry/cure thoroughly at room conditions (25±10° C., 50% relative-humidity) for 30 minutes followed by an additional 15 minutes in a ventilated oven maintained at a temperature of 140° C.

The invention claimed is:

1. A graphitic nanocomposite comprising:
   a graphitic nanomaterials;
   a functional group functionalizing the graphitic nanomaterials; and
   a silane or metal oxide material forming a solid state matrix with the graphitic nanomaterials, wherein the graphitic nanocomposite is formed by mixing the graphitic nanomaterials that have been functionalized with a sol-gel solution, the sol-gel solution is an alkoxysilane or metal oxide precursor, the alkoxysilane and the metal oxide precursor of the sol-gel solution have a general formula of $M(OR)_{4-x}R'_x$ (M=Si, Al, In, Sn or Ti; $0<x\leq3$), where the R and R' in the general formula are the same or different and the R and R' in the general formula comprise a substituted or unsubstituted amine, and the graphitic nanomaterials are dispersed homogenously in the silane or metal oxide material.

2. The graphitic nanocomposite of claim 1, wherein the graphitic nanomaterials are a carbon rich material with densely packed carbon in a regular $sp^2$-bonded structure.

3. The graphitic nanocomposite of claim 1, wherein the graphitic nanomaterials are carbon black, carbon fiber, graphite, graphene, graphene oxide, carbon nanotubes, or fullerene.

4. The graphitic nanocomposite of claim 1, concentration of graphitic nanomaterials in the sol-gel solution can range between 0.001 and 50 w/v %.

5. The graphitic nanocomposite of claim 1, wherein the functional group has a moiety comprising at least one alkoxysilane or metal oxide precursor, a functional group that can react with the at least one alkoxysilane or metal oxide precursor to form covalent bonding, or a combination thereof.

6. The graphitic nanocomposite of claim 1, wherein the functionalization of the graphitic nanomaterials occur through amination.

7. The graphitic nanocomposite of claim 1, wherein the functional group is an amine.

8. The graphitic nanocomposite of claim 1, wherein the functional group is 4-AMINOBUTYLTRIETHOXYSILANE, 4-AMINOBUTYLTRIMETHOXYSILANE, 4-AMINO-3,3-DIMETHYLBUTYLMETHYLDIETHOXYSILANE, 4-AMINO-3,3-DIMETHYLBUTYLMETHYLDIMETHOXYSILANE, 4-AMINO-3,3-DIMETHYLBUTYLTRIETHOXYSILANE, 4-AMINO-3,3-DIMETHYLBUTYLTRIMETHOXYSILANE, 1-AMINO-2-(DIMETHYLETHOXYSILYL)PROPANE, 1-AMINO-2-(DIMETHYLMETHOXYSILYL)PROPANE, N-(2-AMINOETHYL)-3-AMINOISOBUTYLDIMETHYLETHOXYSILANE, N-(2-AMINOETHYL)-3-AMINOISOBUTYLDIMETHYLMETHOXYSILANE, N-(2-AMINOETHYL)-3-AMINOISOBUTYLMETHYLDIETHOXYSILANE, N-(2-AMINOETHYL)-3-AMINOISOBUTYLMETHYLDIMETHOXYSILANE, (AMINOETHYLAMINOMETHYL)PHENETHYLTRIETHOXYSILANE, (AMINOETHYLAMINOMETHYL)PHENETHYLTRIMETHOXYSILANE, N-(2-AMINOETHYL)-3-AMINOPROPYLMETHYLDIETHOXYSILANE, N-(2-AMINOETHYL)-3-AMINOPROPYLMETHYLDIMETHOXYSILANE, N-(2-AMINOETHYL)-3-AMINOPROPYLSILANETRIOL, N-(2-AMINOETHYL)-3-AMINOPROPYLTRIETHOXYSILANE, N-(2-AMINOETHYL)-3-AMINOPROPYLTRIMETHOXYSILANE, N-(2-AMINOETHYL)-11-AMINOUNDECYLTRIETHOXYSILANE, N-(2-AMINOETHYL)-11-AMINOUNDECYLTRIMETHOXYSILANE, N-(6-AMINOHEXYL) AMINOMETHYLTRIETHOXYSILANE, N-(6-AMINOHEXYL) AMINOPROPYLTRIMETHOXYSILANE, 3-(m-AMINOPHENOXY)PROPYLTRIETHOXYSILANE, 3-(m-AMINOPHENOXY)PROPYLTRIMETHOXYSILANE, AMINOPHENYLTRIETHOXYSILANE, m-AMINOPHENYLTRIMETHOXYSILANE, p-AMINOPHENYLTRIETHOXYSILANE, p-AMINOPHENYLTRIMETHOXYSILANE, N-3-[(AMINO(POLYPROPYLENOXY)]AMINOPROPYLTRIETHOXYSILANE, N-3-[(AMINO(POLYPROPYLENOXY)]AMINOPROPYLTRIMETHOXYSILANE, 3-AMINOPROPYLDIISOPROPYLETHOXYSILANE, 3-AMINOPROPYLDIISOPROPYLMETHOXYSILANE, 3-AMINOPROPYLDIMETHYLETHOXYSILANE, 3-AMINOPROPYLDIMETHYLMETHOXYSILANE, 3-AMINOPROPYLMETHYLBIS(TRIMETHYLSILOXY)SILANE, 3-AMINOPROPYLMETHYLDIETHOXYSILANE, 3-AMINOPROPYLMETHYLDIMETHOXYSILANE, 3-AMINOPROPYLPENTAMETHYLDISILOXANE, 3-AMINOPROPYLSILANETRIOL, 3-AMINOPROPYLTRIETHOXYSILANE, 3-AMINOPROPYLTRIMETHOXYSILANE, 3-AMINOPROPYLTRIS(METHOXYETHOXYETHOXY)SILANE, 3-AMINOPROPYLTRIS(TRIMETHYLSILOXY)SILANE, 11-AMINOUNDECYLTRIETHOXYSILANE, 11-AMINOUNDECYLTRIMETHOXYSILANE, 1,3-BIS(2-AMINOETHYLAMINOMETHYL)TETRAMETHYLDISILOXANE, BIS(p-AMINOPHENOXY)DIMETHYLSILANE, 1,3-BIS(3-AMINOPROPYL)TETRAMETHYLDISILOXANE, (3-TRIETHOXYSILYLPROPYL)DIETHYLENETRIAMINE or (3-TRIMETHOXYSILYLPROPYL)DIETHYLENETRIAMINE.

9. The graphitic nanocomposite of claim 1, wherein the functional group is 1,2-DIAMINOETHANE, PROPANE-1,3-DIAMINE, BUTANE-1,4-DIAMINE, PENTANE-1,5-DIAMINE, HEXANE-1,6-DIAMINE, 1,2-DIAMINOPROPANE, DIPHENYLETHYLENEDIAMINE, DIAMINOCYCLOHEXANE, o-XYLYLENEDIAMINE, m-XYLYLENEDIAMINE, p-XYLYLENEDIAMINE, o-PHENYLENEDIAMINE, PHENYLENEDIAMINE, p-PHENYLENEDIAMINE, 2,5-DIAMINOTOLUENE, 4,4'-DIAMINOBIPHENYL, 1,8-DIAMINONAPHTHALENE, POLY(ETHYLENE GLYCOL) DIAMINE, DIETHYLENE TRIAMINE, DIPROPYLENE TRIAMINE, N-(3-AMINOPROPYL)-1,4-DIAMINOBUTANE, BIS(HEXAMETHYLENE)TRIAMINE, PROPANE-1,1,1-TRIAMINE, PROPANE-1,2,3-TRIAMINE, PENTANE-1,2,5-TRIAMINE, PENTANE-1,3,5-TRIAMINE, PHENYL-1,2,4-TRIAMINE, PHENYL-1,3,5-TRIAMINE, 2,4,6-TRIMETHYLBENZENE-1,3,5-TRIAMINE, 1,3,5-TRIAZINE-2,4,6-TRIAMINE, DIAMINOPROPYLTETRAMETHYLENEDIAMINE, TRIETHYLENETETRAMINE, TRIS (2-AMINOETHYL) AMINE, TRIS(2-AMINOPROPYL)AMINE, TRIS(4-AMINOPHENYL)AMINE, POLYETHYLENIMINE, POLYPROPYLENIMINE, POLY(AMIDO AMINE) DENDRIMERS or TRIAZINE DENDRIMERS.

10. The graphitic nanocomposite of claim 1, wherein the graphitic nanocomposite is a free standing bulk, thin film, or three-dimensional network.

11. The system of claim 1, wherein the graphitic nanomaterials are entrapped or covalently linked within the graphitic nanocomposite.

12. The graphitic nanocomposite of claim 1, wherein the functional group has a moiety of building blocks of the graphitic nanocomposite.

13. The graphitic nanocomposite of claim 12, wherein the graphitic nanomaterials are carbon black, carbon fiber, graphite, graphene, graphene oxide, carbon nanotubes, or fullerene.

* * * * *